(12) United States Patent
Bosser et al.

(10) Patent No.: US 7,924,211 B2
(45) Date of Patent: Apr. 12, 2011

(54) ELECTROMAGNETIC PULSE REFLECTOR DETECTION METHOD

(75) Inventors: Luc Bosser, Rambouillet (FR); Stephane Kemkemian, Paris (FR); Myriam Nouvel, Plaisir (FR)

(73) Assignee: Thales (FR)

( * ) Notice: Subject to any disclaimer, the term of this patent is extended or adjusted under 35 U.S.C. 154(b) by 147 days.

(21) Appl. No.: 12/301,086

(22) PCT Filed: May 14, 2007

(86) PCT No.: PCT/EP2007/054622
§ 371 (c)(1),
(2), (4) Date: May 21, 2009

(87) PCT Pub. No.: WO2007/131980
PCT Pub. Date: Nov. 22, 2007

(65) Prior Publication Data
US 2009/0278729 A1 Nov. 12, 2009

(30) Foreign Application Priority Data
May 16, 2006 (FR) .................................... 06 04371

(51) Int. Cl.
*G01S 13/00* (2006.01)
(52) U.S. Cl. .................. 342/26 R; 342/26 A; 342/26 B; 342/26 C; 342/26 D; 342/89
(58) Field of Classification Search ............... 342/26 R, 342/26 A, 26 B, 26 C, 26 D, 89–103, 175, 342/195
See application file for complete search history.

(56) References Cited

U.S. PATENT DOCUMENTS

| | | | | | |
|---|---|---|---|---|---|
| 3,720,959 | A | * | 3/1973 | Hahn | 623/17.17 |
| 4,101,891 | A | * | 7/1978 | Fletcher et al. | 342/25 A |
| 5,189,428 | A | * | 2/1993 | Bouvet et al. | 342/132 |
| 5,327,141 | A | * | 7/1994 | Sheldon | 342/159 |
| 5,627,543 | A | * | 5/1997 | Moreira | 342/25 A |
| 6,072,419 | A | * | 6/2000 | Normant | 342/25 F |

(Continued)

FOREIGN PATENT DOCUMENTS
EP 0493189 7/1992

(Continued)

*Primary Examiner* — Thomas H Tarcza
*Assistant Examiner* — Peter Bythrow
(74) *Attorney, Agent, or Firm* — Stroock & Stroock & Lavan LLP (57) ABSTRACT

Detecting reflectors of an emitted electromagnetic pulse, using a received signal, by time-sampling the received signal and the emitted pulse at a same sampling frequency, each received sample corresponding to a return-trip distance for the emitted pulse between its transmitter and a possible reflector. The sampled received signal is divided by the emitted pulse sampled and temporally translated into an interval of duration equal to the emitted pulse divided into L samples, producing L results of the division. A weighted summing of the L results of the division is calculated, the sets of L weights each having a support on which the weights are not zero, every subinterval of length between L/n and L being the support for at least one set of weights and no support having a length of less than L/n, wherein the sums of the weights of a set all being equal, and n is a nonzero integer such that L/n is greater than or equal to 2. Finally, determining the minimum of the summations, wherein a nonzero minimum characterizes the amplitude of the pulse reflected by a reflector located at the distance corresponding to the start of a time interval being considered.

7 Claims, 5 Drawing Sheets

U.S. PATENT DOCUMENTS

| | | | |
|---|---|---|---|
| 6,232,913 B1 * | 5/2001 | Lehtinen | 342/137 |
| 6,448,923 B1 * | 9/2002 | Zrnic et al. | 342/26 R |
| 6,646,587 B2 * | 11/2003 | Funai | 342/26 R |
| 7,583,222 B2 * | 9/2009 | O'Hora et al. | 342/26 R |
| 7,589,666 B2 * | 9/2009 | Passarelli et al. | 342/196 |
| 7,750,839 B2 * | 7/2010 | Kemkemian | 342/26 B |
| 2009/0278729 A1 * | 11/2009 | Bosser et al. | 342/118 |

FOREIGN PATENT DOCUMENTS

FR  2763398  11/1998

* cited by examiner

ELECTROMAGNETIC PULSE REFLECTOR DETECTION METHOD

This application under 35 U.S.C. §371 is the U.S. national stage application of, and claims priority from, International Application No. PCT/EP2007/054622, filed May 14, 2007, which in turn claims priority from French patent application No. 06/04371 filed with the French Patent Office on May 16, 2006, both of which are incorporated herein by reference in their entirety.

The present invention relates to a method for detecting reflectors of an electromagnetic pulse. It is applied, for example, in the field of weather radars.

The detection of distant objects by emitting electromagnetic pulses and analyzing all the electromagnetic signals picked up with a view to finding among them possible echoes of the emitted pulses is the principle of radars. The emitted pulses are adapted to the distance and to the kind of objects to be detected and capable of reflecting the pulses. In particular, the pulses may last longer or shorter durations, have a higher or lower amplitude and frequency, and be separated from each other by a longer or shorter duration. All this partly characterizes a "waveform", each waveform having specific propagation and reflection properties more or less suited to the radar. Indeed, depending on the propagation and reflection properties of the waveform, the search for possible echoes in the signals picked up may be simple or, on the contrary, require specific processing.

For example, weather radars detect areas of precipitation, characterized by their pressure and their hygrometry rate, at very great distances, which may exceed 100 nautical miles. The pulses in the X-band, in the region of 10 gigahertz, are reflected well by this type of reflector. In view of the long range specified and the amplitude limitation linked with the low cost transmitters used, the pulses must be long, of the order of several hundred microseconds, in order to have the power necessary to propagate at such return-trip distances. But increasing the pulse length lowers the resolution of the radar, which would not be able to distinguish two targets separated by a distance less than the pulse length. For this reason a phase pattern is encoded in the pulse by varying the frequency of the emitted signal according to a low-amplitude linear function, of around several tens of kilohertz, called linear frequency chirp. This phase pattern can also be recognized in the signals picked up, amidst noise, and as many times as the pulse will have been reflected. The frequency of repetition of the emitted pulses is low, much less than a kilohertz.

One of the objectives of the processing carried out by a radar on the electromagnetic signals picked up is to establish a "compressed-distance profile" by a method called "compression". This involves concentrating or "compressing" the energy of a signal backscattered by a reflector or "contributor" over a distance range that is as limited as possible, which energy before compression is diluted over a very extended distance range, since it is equal to the length of the emitted pulse. The principle of pulse compression consists in enriching the information contained in the emitted pulse, for example by introducing a linear frequency modulation in order to be able to relocate this particular pattern easily amidst noise.

For a given direction in which a pulse has been emitted, i.e. with a fixed azimuth and elevation, a compressed-distance profile graphically indicates the reflected signal amplitude as a function of the distance traveled by the pulse from its emission through to a possible reflector. In a compressed-distance profile the x-axis represents the distance between the transmitter and the reflector, and the y-axis represents the amplitude of the reflected signal. Thus, as illustrated by the following, an amplitude peak in a compressed-distance profile characterizes the echo of a lobe of the emitted pulse at a contributor situated at a certain distance, the reflector contributing to the amplitude of the electromagnetic signals picked up at the emitter. Such a peak is called a "correlation peak" as it establishes a link between the emitted pulse and the signals picked up at the moment corresponding to the time to travel the return-trip distance indicated on the x-axis at the speed of light.

A conventional compression method called the "matched filtering method" allows the construction of compressed-distance profiles. It involves, for a hypothetical distance D, correlating the received signal with the emitted signal shifted by a distance D, i.e. delayed by 2 D/c where c characterizes the speed of light. If a contributor is located at the distance D, a correlation peak appears. This peak is all the more fine, i.e. concentrated over a restricted distance range, the richer the information contained in the emitted pulse, in other words the wider the emitted band. The pulse response thus emitted is composed of a main lobe which provides the position of the echo in terms of distance, accompanied by sidelobes, which themselves in no way correspond to a physical echo, but are "artifacts" connected with the pulse compression method itself. Another conventional method, called the "pseudo-matched filtering method", enables the level of sidelobes to be reduced on the condition that the characteristics of the backscattered signals are perfectly known. Correlation peaks characterizing the echo of the main lobe thus appear very high in relation to those characterizing the echo of the sidelobes. This will be illustrated by the following. These methods prove effective with many emitted waveforms and are used in many radars. They are based on the principle of phase-coding the emitted pulse that has to be found in the signals picked up. The correlation criterion enabling location of a correlation peak is therefore the presence of the phase-coded pattern. But in the case of a weather radar, for example, the waveform used, and previously described, is very sensitive to the Doppler effect, which considerably modifies or interferes with the frequency of the reflected signal as a function of the relative velocity of the contributor in relation to the transmitter. By extension, the variation in frequency of the reflected signal in relation to the emitted signal will be called the "Doppler contribution" or alternatively "Doppler", this variation being caused by the velocity of the contributor relative to the transmitter. The frequency of the reflected signal is thus no longer the same as that of the emitted signal and the phase-coded pattern is deformed. The conventional compression methods by matched filtering and pseudo-matched filtering no longer work as effectively. Notably, the compressed-distance profiles have particularly high sidelobe levels which may mask the main lobes of low-reflectivity contributors. Furthermore, it is inconceivable to calculate the Doppler contributions and deduce from these the deformed phase-coded pattern, as to do this it would be necessary to know the relative velocity of the contributor in relation to the transmitter, and hence the velocity of the contributor, which can never be the case. Indeed, the approach velocities of various contributors cannot be determined unambiguously by a Doppler analysis, as the repetition frequency of the pulses cannot be high enough. In the X-band, for example, some radar modes are characterized by a pulse repetition frequency of around 400 hertz, while the range of possible Doppler frequencies covered by all contributors has a width of 6000 hertz.

The invention has the aim notably of solving this problem and guaranteeing an extremely low sidelobe level in the compressed-distance profile, whatever the Dopplers of the various echoes. To this end, the object of the invention is a method for detecting reflectors of an electromagnetic pulse comprising a phase of time-sampling the received signal and the emitted pulse at a same sampling frequency. Each sample corresponds to a return-trip distance for the pulse between its transmitter and a possible reflector. The method also comprises, in an interval of duration equal to the emitted pulse divided into L samples, a phase of dividing the sampled received signal by the emitted pulse sampled and temporally translated into this interval. It also comprises a phase of weighted summations of the L results of the division. The sets of L weights each have a support on which the weights are not zero. Every subinterval of length between L/n and L, where n is a nonzero integer such that L/n is greater than or equal to 2, is the support for at least one set of weights and no support has a length of less than L/n. The sums of the weights of a set are all equal. Finally, it comprises a phase of determining the minimum of the summations, a nonzero minimum characterizing the amplitude of the pulse reflected by a reflector located at the distance corresponding to the start of the time interval being considered.

In one embodiment, the interval of duration equal to the emitted pulse may be divided into L=32 samples and the smallest supports of sets of weights may, for example, have a length of 8 samples, which corresponds to n=4.

Advantageously, every subinterval of length between L/n and L may be the support for a single set of weights, for example using the well-known conventional Blackman family of sets of weights. But the sets of matchable weights may also be used, such as the Hanning sets of weights, which are also well known.

The method may also be applied to several time intervals corresponding to the same distance and with the same sets of weights. The summations corresponding to the same set of weights are then summed among themselves before determining the minimum of the summations, a nonzero minimum always characterizing the amplitude of the pulse reflected by a reflector located at the distance corresponding to the start of the time interval being considered.

Main advantages of the invention are also that it can be implemented in current systems without changing the hardware or software architecture. Notably, it requires no change to the radar transmitter-receiver system as it exploits a linear frequency modulated pulse, the most widely used. Furthermore, the additional calculation load is completely suited to the performance levels specified for these systems and to the power of the computers they employ. Its cost is therefore extremely minimal.

Further features and advantages of the invention will become apparent with the help of the following description, provided with reference to the appended drawings, in which.

Figure 1A:
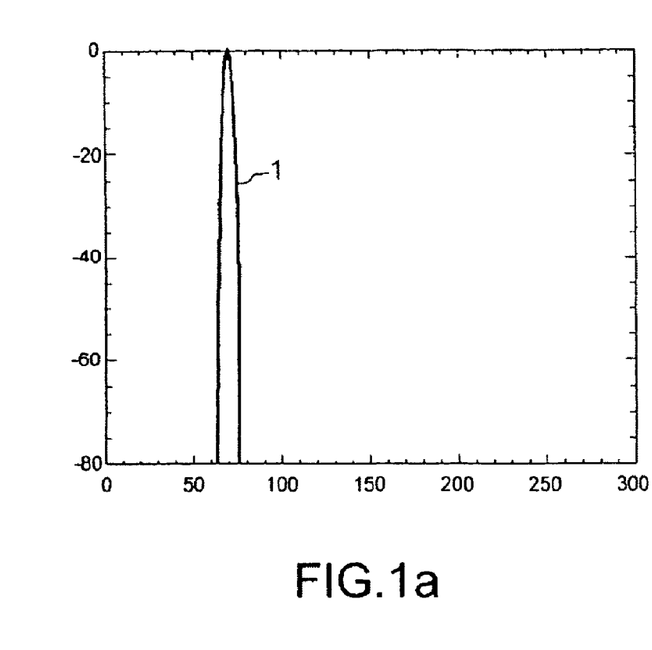
FIGS. 1a and 1b illustrate, through compressed-distance profiles, correlation peaks characterizing the echo from the same pulse emitted by a weather radar at the same contributor, with zero Doppler contribution and nonzero Doppler contribution respectively, the peaks having been obtained by the pseudo-matched filtering method.

FIG. 1a illustrates through a compressed-distance profile a correlation peak characterizing the echo of a pulse emitted by a weather radar at a zero Doppler contributor, the peak having been obtained by the pseudo-matched filtering method. The pulse is in the X-band, its length T is 275 microseconds and the linear frequency chirp has an amplitude B of 67 kilohertz. The x-axis represents the transmitter-reflector distance in nautical miles and the y-axis represents the amplitude of the signal received in decibels.

A correlation peak 1 unambiguously indicates the presence of a contributor at a distance of between 60 and 70 nautical miles in the direction of pulse emission. The peak 1 uniquely characterizes the echo of the main lobe of the emitted pulse, the level of the sidelobes not appearing at the scale of the coordinate system used in the example. This is because a low sidelobe level in a compressed-distance profile is obtained conventionally by pseudo-matched filtering. This method consists, first of all, in applying a process to the temporal representation of the received signal and to the temporal representation of the emitted signal known by the name "Fast Fourier Transform", which will be called FFT in the following, which enables the frequency or spectral representation of the signal to be obtained. Over the spectral range corresponding to the emitted band, the spectrum of the received signal is divided by the spectrum of the emitted signal and multiplied by a set of weights sufficient to guarantee an acceptable level of sidelobes, the out-of-band range of the spectrum itself being set to zero. The compressed-distance profile is finally obtained by working out the inverse FFT of the spectrum filtered in this way.

Figure 1B:
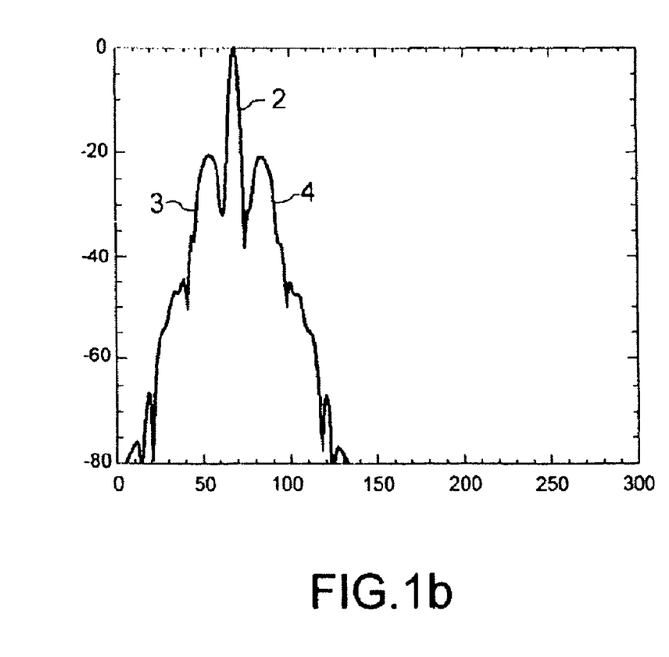

FIG. 1b illustrates, through a compressed-distance profile in the same coordinate system as that from FIG. 1a, correlation peaks characterizing the echo of the same pulse at the same contributor as the example of FIG. 1a, the peaks having been obtained by exactly the same pseudo-matched filtering method. But this time the contributor has a nonzero Doppler contribution $f_d$=3000 hertz.

Correlation peaks 2, 3 and 4 indicate simply the presence of the contributor in the direction of pulse emission. Peak 2 characterizes the echo at the contributor of the main lobe of the emitted pulse, peaks 3 and 4 characterize the levels of the sidelobes. It is the frequency shift between the emitted signal spectrum and the received signal spectrum, a shift equal to the Doppler of the contributor, that causes the increase in the level of the sidelobes after applying the method of compression by pseudo-matched filtering. Indeed, for the waveforms considered in the example, the Doppler shift $f_d$=3000 hertz is not negligible compared with the emitted bandwidth B=67 kilohertz. However, this shift cannot be corrected by applying any set of weights to the spectrum.

In particular, the large increase in the level of the sidelobes becomes incompatible with the dynamics sought on the distance-compressed profile: very low-reflectivity echoes are masked by the sidelobes coming from high-reflectivity echoes. Compression by a conventional technique, whether the matched filtering method or the pseudo-matched filtering method, is therefore ill-suited to the waveforms used by the weather radar in the example, as the number of contributors illuminated by the beam and their respective Dopplers are a priori unknown. Furthermore, if the range of possible Doppler frequencies is limited, the emission of several pulses cannot, however, be carried out at a high enough frequency for determining unambiguously the Doppler frequencies of the various contributors. In the example in the figures, the pulses are emitted at the frequency of only 400 hertz.

Thus in the context of some waveforms, such as those used in weather radars for example, the matched filtering and pseudo-matched filtering methods no longer meet the detection problem posed.

Figure 2:
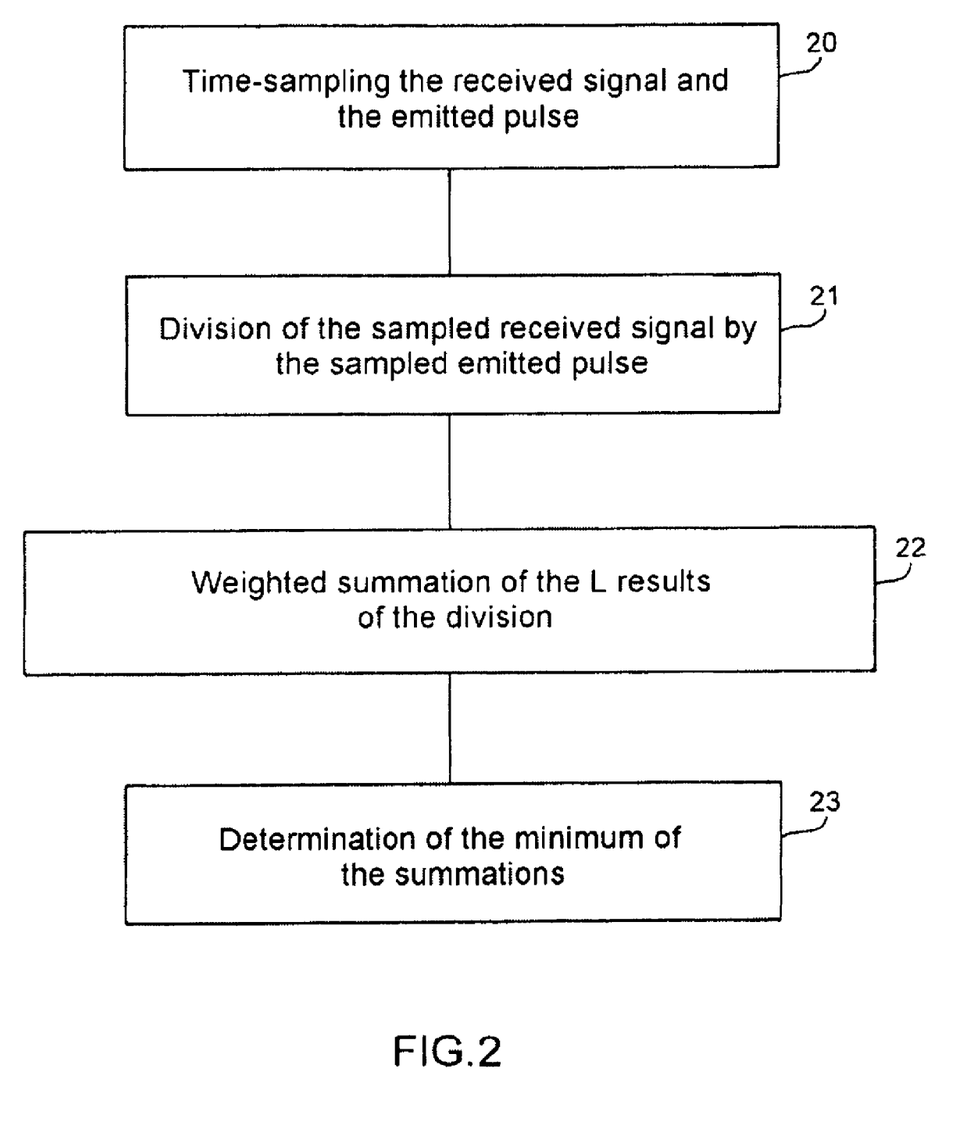
FIG. 2 shows the possible phases of the method according to the invention using an overview diagram.

FIG. 2 illustrates, using an overview diagram, the possible phases of the method according to the invention applied to the same example waveform as that of FIGS. 1a and 1b.

The method comprises a phase 20 of time-sampling the received signal and the emitted pulse at the same sampling frequency. The sampling of the received signal and the emitted pulse is done using the same sampling clock or synchronized sampling clocks. However, the sampling of the emitted pulse may be carried out upstream during a calibration phase that effectively records the emitted pulse, or even more simply produced purely theoretically using modeling of the emitted pulse. Considering the example of the weather radar waveform from FIGS. 1a and 1b, and if the length of the emitted pulse in the number of samples is called L, a sampling frequency $F_{ech}$=116364 hertz advantageously allows the emitted pulse of length T=275 microseconds to be cut up into L=32 successive samples of an identical duration of around 8.6 microseconds. Thus, the received signal is also cut up into samples of 8.6 microseconds. Each sample is denoted by its index k, which can be any integer greater than or equal to zero, k=0 denoting the first sample in chronological order, k=1 denoting the second sample in chronological order, and so on. By extension, the sample with the index k will be denoted by "distance k box". In fact, the time elapsed between the instant marking the start of the pulse, which is the start of the sample with the index 0, and the instant marking the start of the sample with the index k also corresponds to the return-trip distance traveled by the electromagnetic pulse at the speed of light between these two instants. This enables each sample to be assimilated to a distance from the transmitter at which a reflector may be located.

The method comprises a phase 21, in an interval of duration equal to the emitted pulse divided into L samples, of dividing the sampled received signal by the emitted pulse sampled and temporally translated into this interval. In the weather radar example being considered, for a restriction of picked-up signals to a consecutive series of L=32 samples with indices between k and k+L−1 for any index k, it involves dividing two by two the values of the samples by the values of the 32 samples that represent the emitted pulse. By analogy with a conventional signal-processing operation known by the expression "deramping", and which notably includes the division of a received signal by a linearly frequency modulated emitted signal, the result of this division over 32 samples will be called the "deramped signal" in the following.

FIGS. 3a, 3b, 3c and 3d illustrate using graphs the phase of dividing the received signal in the method according to the invention. They are all represented in the same coordinate system with the sample index, or distance box, on the x-axis and the signal amplitude in decibels on the y-axis.

Figure 3A:
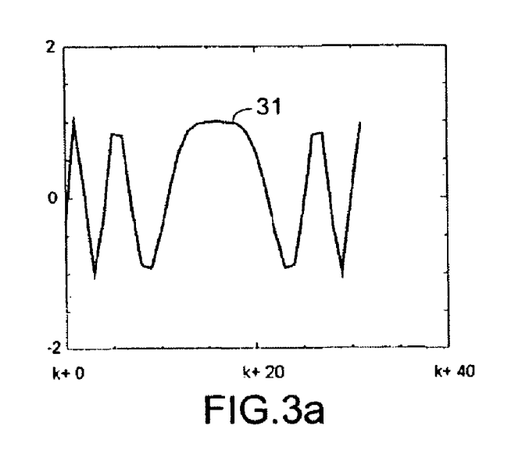
FIGS. 3a, 3b, 3c and 3d use graphs to illustrate the phase of dividing the received signal in the method according to the invention.
Figure 3B:
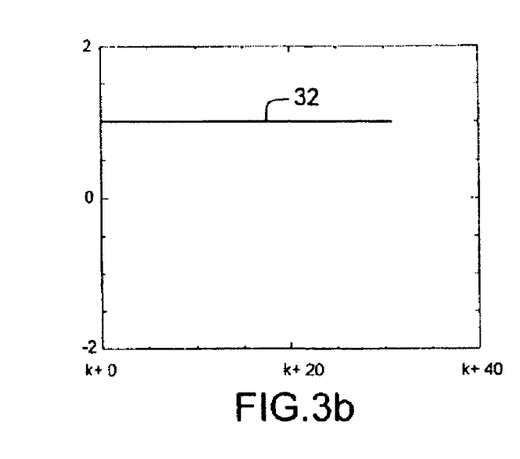

FIG. 3a represents, with a curve 31, the signal received if a zero Doppler contributor is located in the distance box k. FIG. 3b represents, with a curve 32, the corresponding deramped signal. The deramped signal is continuous, i.e. of zero frequency, and stationary, i.e. of constant amplitude, over the L=32 samples that follow the sample of index k. It will later be said that if a contributor is located in the distance box k, then the deramped signal contains a continuous stationary component.

For the same contributor located in the same distance box k, a nonzero Doppler would simply translate into the fact that the deramped signal is continuous over a number of samples very slightly less than L, equal in fact to L−[δk], where $$\delta k = \frac{f_d}{\delta f}, []$$

denotes the nearest integer and $$\delta f = \frac{B}{T \cdot F_{ech}}.$$

In the example of the weather radar in which $f_d$=3000 hertz, B=67 kilohertz, T=275 microseconds and $F_{ech}$=116364 hertz, the deramped signal is therefore continuous and stationary over L−1=31 samples and zero over a single sample.

Figure 3C:
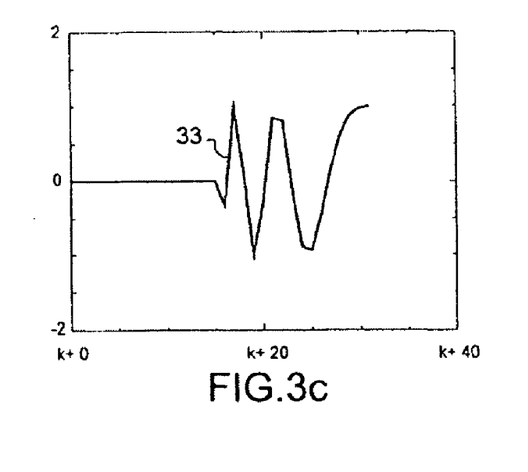
Figure 3D:
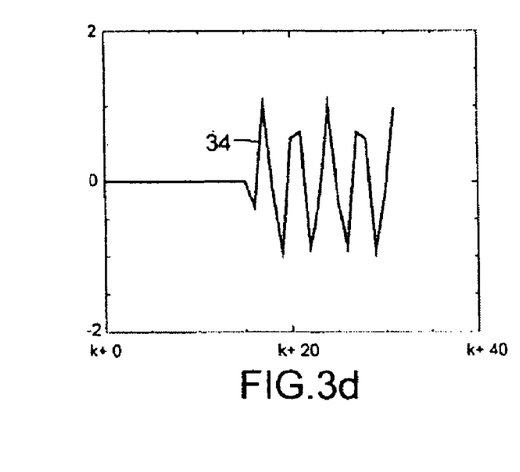

FIG. 3c represents, with a curve 33, the signal received if no contributor is located in the distance box k. FIG. 3d represents, with a curve 34, the corresponding deramped signal. The deramped signal has the following characteristics:
zero signal for contributors separated by a number of distance boxes greater than L; and
nonstationary signal present over only part of the window of analysis of size L and of nonzero frequency proportional to the distance that separates the contributor from the distance box k.

It will later be said that if no contributor is located in the distance box k, then the deramped signal does not contain any continuous stationary component.

The principle of the method according to the invention is to allocate the continuous stationary component of the corresponding deramped signal to the distance box k of the compressed-distance profile. If this component is nonzero, then a contributor is located in the distance box k. If this component is zero, then no contributor is located in the distance box k. The following steps of the method aim notably to spot the continuous stationary component in a deramped signal, knowing that the echoes are received mixed and with noise.

The method comprises a phase 22 of weighted summations of the L results of the division, the sets of L weights each having a support on which the weights are not zero, each subinterval of length between L/n and L, where n is a nonzero integer such that L/n is greater than or equal to 2, being the support for at least one set of weights and no support having a length of less than L/n, the sums of the weights of a set all being equal.

It involves summing the values of the L samples of the deramped signal several times, while each time allocating to them a certain weight, the family of sets of L weights used having the following properties:
for a stationary signal of zero frequency, the various weighted sums return an identical nonzero value proportional to the amplitude of the signal; and
on the contrary, for a signal that is not stationary or of nonzero frequency, various sets of weights are able to cancel the weighted sum of the signal.

Considering the weather radar example in which L=32 and advantageously choosing n=4, the length of the supports thus varies from 8 to 32 samples, that is 25 distinct support lengths. For each of the 25 support lengths, it is necessary to consider all the possible supports having this length. For example, for the support length equal to 8 samples, it is possible to imagine sliding the support of length 8 all along the 32 samples, i.e.

offsetting the support. The first support then extends from k=0 to k=7 and corresponds to an offset value of 0. The second support extends from k=1 to k=8 and corresponds to an offset value of 1. And so on. The last support extends from k=24 to k=31 and corresponds to an offset value of 24. There are therefore 25 supports of length 8, each characterized by its offset of between 0 and 24. Similarly, there are 24 supports of length equal to 9 samples. And so on. There are 2 supports of length 31 samples and a single support of length 32 samples. Altogether, for L=32 and n=4, there are 325 distinct supports.

Figure 4A:
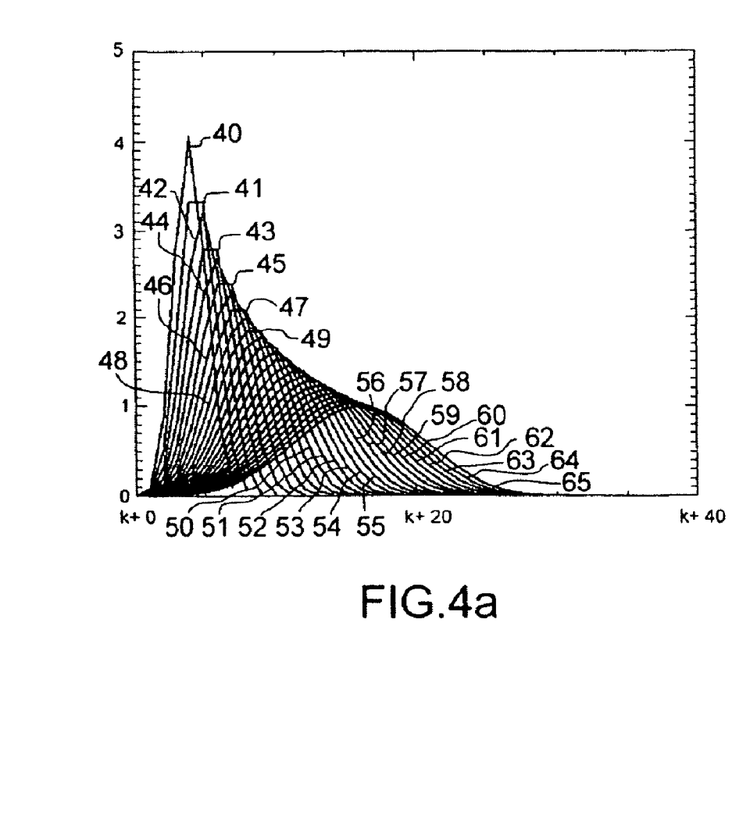
FIGS. 4a and 4b use graphs to illustrate the sets of weights that can be used in the method according to the invention.

FIG. 4a illustrates using graphs a set of weights for each of the possible support lengths, namely from 8 to 32 samples. The sample indices are on the x-axis and the weighting values are on the y-axis. Curves 40, 41, 42, 43, 44, 45, 46, 47, 48, 49, 50, 51, 52, 53, 54, 55, 56, 57, 58, 59, 60, 61, 62, 63, 64 and 65 respectively represent the sets of weights of length 8 to 32 samples and all corresponding to the offset value 0. Whatever set of weights is considered, the sum of its weights must always be equal to the same value. This ensures that the weighted sum of a stationary, zero-frequency component will always be equal to the same value. In the example of FIG. 4a, the amplitude of the weights is inversely proportional to the support length in order to ensure that their sums are indeed equal.

Figure 4B:
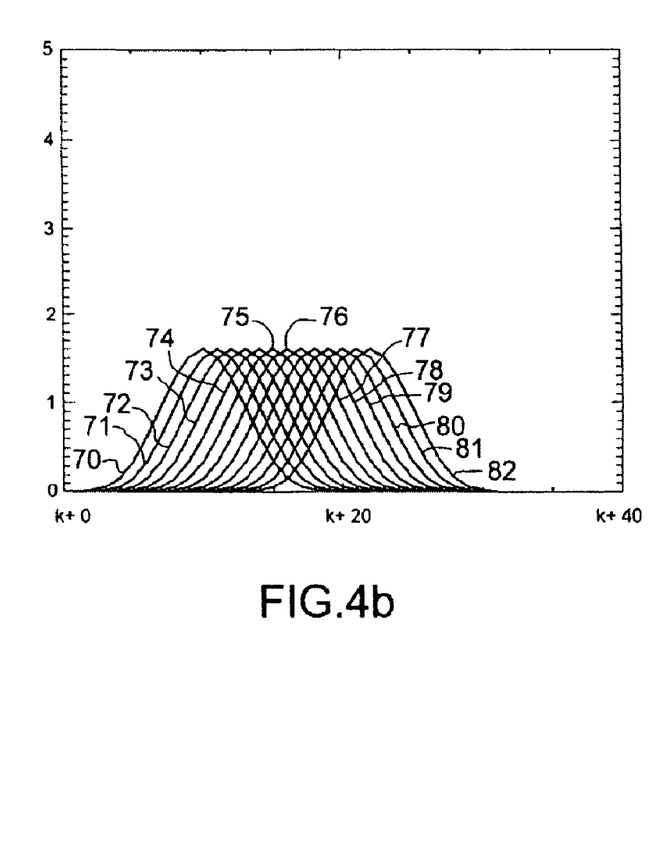

FIG. 4b illustrates using graphs the sets of weights that have a support of length equal to 20 for all the offset values, namely between 0 and 12, possible at this length. The coordinate system is the same as that of FIG. 4a. Curves 70, 71, 72, 73, 74, 75, 76, 77, 78, 79, 80, 81 and 82 respectively represent the sets of weights of length 20 samples corresponding to the offset values 0, 1, 2, 3, 4, 5, 6, 7, 8, 9, 10, 11 and 12. In the example of FIG. 4b, the weights have simply been offset at the same time as their support; therefore their sums are indeed equal.

FIGS. 4a and 4b show an example of sets of weights, called conventional weights, that may be used in the method according to the invention. These are the Blackman weights, well known furthermore for their extremely low level of sidelobes. Conventional families of weights, and notably the Blackman weights, are used in many signal filtering methods. In these families of sets of weights, a single set of weights advantageously corresponds to a length-offset pair. But there are also families of sets of weights that are called matchable, which associate a series of weights with a length-offset pair, each of the weights being calculated from a parameter $\alpha$ with a real value in the interval $[0,1]$. These weights have various compromises, which in the weather radar example may notably enable improvement of the resolution without deteriorating the level of sidelobes and more effective noise filtering. In the context of the method according to the invention, the use of a family of sets of matchable weights is simple: it suffices, in the previous method, to replace the conventional weighted sum associated with a length-offset pair with the minimum weighted sum among the various weighted sums associated with the same length-offset pair obtained by scanning all the possible values of the parameter $\alpha$. Thus, a family of sets of matchable weights called Hanning weights, which is in addition well known and used in many signal-filtering methods, may advantageously be used in the context of the method according to the invention.

Finally, it must be noted that the zero weights in a set of weights, i.e. the weights outside the support, have the aim of canceling the nonstationary or nonzero frequency deramped signal. The smaller the length of a support, the greater its chance of canceling this signal. But it should be noted that there cannot, however, be sets with a support limited to 1 sample in a family of sets of weights. This is because some of these sets of weights would cancel, by summation, a stationary, zero-frequency component deformed by a possible Doppler contribution, the corresponding deramped signal being zero over $[\delta k]$ samples, as previously explained. As $[\delta k]$, which is proportional to the Doppler of the contributor considered, is a priori not known, the method according to the invention therefore points to a limitation to supports with lengths that vary between L/n and L, n being a nonzero integer such that L/n is greater than or equal to 2. In fact, n depends on L and will be greater, the larger L is, the theoretical aim being to avoid sets of weights the support of which is limited to 1 sample. In practice, in order to ensure a larger safety margin, the supports will have a length clearly greater than 2.

The method comprises a phase 23 of determining the minimum of the summations, a nonzero minimum characterizing the amplitude of a pulse reflected by a reflector located at the distance corresponding to the start of the time interval being considered. It involves spotting the deramped signals that have been canceled by one of the summations and which are therefore not stationary components of zero frequency. Indeed, only a stationary component of zero frequency is not canceled by this operation.

If the minimum of the summations is zero, then there is no contributor in the distance box k being considered. This zero value is used to characterize the amplitude of the echo received at the distance box k.

If the minimum of the summations is not zero, then there is a contributor in the distance box k being considered. This nonzero summation value, which is the same no matter which set of weights, is used to characterize the amplitude of the echo received at the distance box k.

In some particular cases, the exploitation of a single pulse may have certain drawbacks. For example, in a deramped signal corresponding to a distance box k and to one pulse, a continuous stationary signal of extremely low amplitude may coexist with one or more noncontinuous and nonstationary signals of high amplitude. Over all the weights tested, one particular configuration may exist for which the combination of different signals cancels the weighted sum. Thus the method according to the invention may miss the echo of a contributor. However, the deramped signal corresponding to the same distance box k, but to a different pulse from that having led the echo of a contributor to be missed, may also be considered. Because of the phase rotation due to the Doppler from one pulse to the next, which is not strictly identical for the different echoes, and because of the presence of uncorrelated noise between pulses, the probability that the same set of weights once again cancels the weighted sum of the signal is low. Consequently, the N pulses can advantageously be benefited from in the following manner: for a given distance box k, the N deramped signals corresponding to the N pulses are considered simultaneously. For each set of weights, N weighted sums are calculated, coming from N deramped signals. These N weighted sums are themselves then added. The final result allocated to the distance box k, i.e. the amplitude of the echo at the distance box k, is the minimum over all the sets of weights tested. This generic method aiming to use several pulses is commonly known by the expression "post-integration". It simultaneously enables the standard deviation of noise on the final distance profile to be reduced, and the accidental loss of low-amplitude echoes to be avoided. It is common in the context of conventional filtering methods.

Figure 5A:
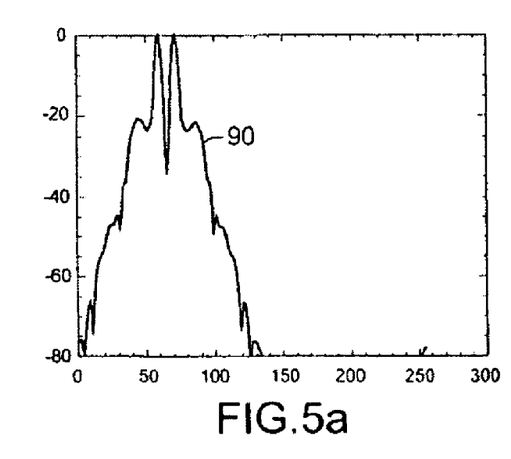
FIGS. 5a, 5b and 5c use graphs to illustrate the compressed-distance profiles corresponding to the reflection by three nonzero Doppler contributors of the same pulse emitted by a weather radar and obtained by the pseudo-matched filtering method, by the method according to the invention using a set of conventional weights, and by the method according to the invention using a set of matchable weights respectively.
Figure 5B:
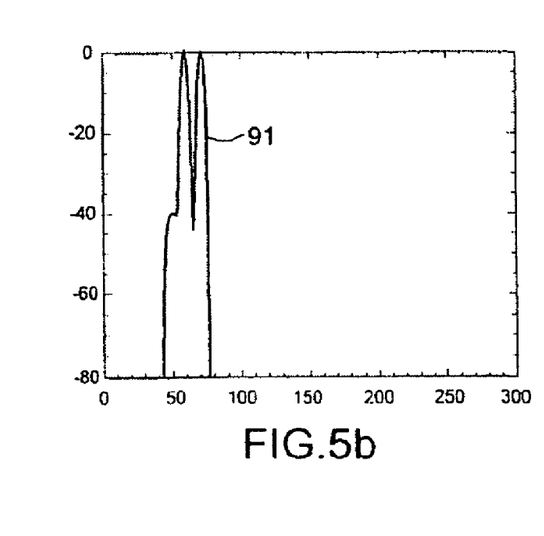
Figure 5C:
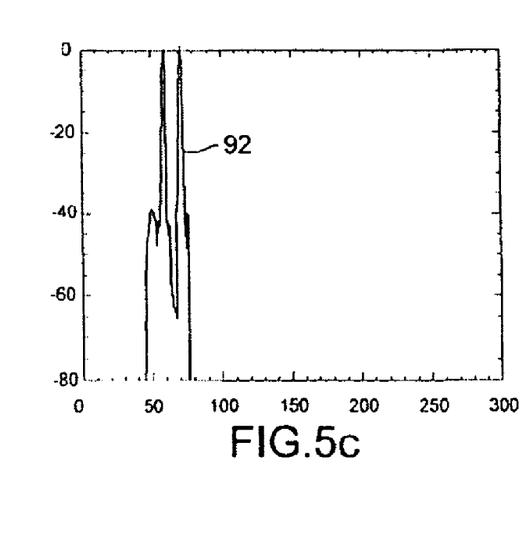

FIGS. 5a, 5b and 5c illustrate using graphs the compressed-distance profiles corresponding to the reflection of the same pulse emitted by a weather radar at three nonzero Doppler contributors, and respectively obtained by the method of pseudo-matched filtering, by the method according to the invention using a set of conventional weights and by the method according to the invention using a set of matchable weights.

Two high-reflectivity contributors are located at distance boxes 60 and 70, with respective Dopplers of 3000 hertz and −2500 hertz. A low-reflectivity contributor is located at distance box 50, with a Doppler of 50 hertz. The distance is given by the x-axis in nautical miles, the amplitude of the reflected signal is given in decibels on the y-axis.

FIG. 5*a* illustrates using a curve 90 the result of a compression by the conventional pseudo-matched filtering method with post-integration. The height of the sidelobes considerably masks the main lobes of the three echoes, which are difficult, or even impossible, to distinguish, even knowing in advance the location of the contributors. FIG. 5*b* illustrates using a curve 91 the result obtained by the method according to the invention using conventional weights. This time the main lobes of the 3 echoes at distance boxes 50, 60 and 70 are clearly distinguished, showing the contributors and the effectiveness of the method according to the invention. FIG. 5*c* illustrates using a curve 92 the result obtained by the method according to the invention using matchable weights. The main lobes of the 3 echoes are even more marked at the distance boxes 50, 60 and 70, and are therefore easier to exploit numerically.

The method according to the invention described in the preceding, whichever variant of its implementation, can be implemented in current systems without changing the hardware or software architecture. Notably, it requires no change to the radar transmitter-receiver system as it exploits a linear frequency modulated pulse, the most widely used. Furthermore, the additional calculation load is completely suited to the performance levels specified for these systems and to the power of the computers they employ. Its cost is therefore extremely minimal.

The invention claimed is:

1. A method for detecting reflectors of an emitted electromagnetic pulse, using a received signal, comprising the steps of:

time-sampling the received signal and the emitted pulse at a same sampling frequency, producing a plurality of received samples and emitted samples, respectively, each received sample corresponding to a return-trip distance for the emitted pulse between its transmitter and a possible reflector;

dividing the sampled received signal by the emitted pulse sampled and temporally translated into an interval of duration equal to the emitted pulse divided into L samples, producing L results of the division;

perform a weighted summing of the L results of the division using a set of L weights, the L weights each having a support on which the weights are not zero, every subinterval of length between L/n and L, where n is a nonzero integer such that L/n is greater than or equal to 2, being the support for at least one set of weights and no support having a length of less than L/n, the sums of the weights of a set all being equal; and determining the minimum of the summations, wherein
a nonzero minimum characterizes the amplitude of the pulse reflected by a reflector located at the distance corresponding to the start of a time interval being considered.

2. The method as claimed in claim 1, wherein L=32.

3. The method as claimed in claim 1, wherein n=4.

4. The method as claimed in claim 1, wherein every subinterval of length between L/n and L is the support for a single set of weights.

5. The method as claimed in claim 4, wherein the set of weights used are Blackman set of weights.

6. The method as claimed in claim 1, wherein the set of weights used are Hanning set of weights.

7. The method of claim 1, wherein the method is applied to several time intervals corresponding to the same distance and with the same sets of weights, the summations corresponding to the same set of weights being summed among themselves before determining the minimum of the summations, a nonzero minimum characterizing the amplitude of the pulse reflected by a reflector located at the distance corresponding to the start of the time interval being considered.

* * * * *